US012461141B2

(12) United States Patent
Lin et al.

(10) Patent No.: US 12,461,141 B2
(45) Date of Patent: Nov. 4, 2025

(54) IDENTIFYING FAILURES IN DEVICE CORES

(71) Applicant: Teradyne, Inc., North Reading, MA (US)

(72) Inventors: Howard Lin, Boston, MA (US); Michael C. Panis, Somerville, MA (US)

(73) Assignee: Teradyne, Inc., North Reading, MA (US)

( * ) Notice: Subject to any disclaimer, the term of this patent is extended or adjusted under 35 U.S.C. 154(b) by 324 days.

(21) Appl. No.: 18/124,466

(22) Filed: Mar. 21, 2023

(65) Prior Publication Data

US 2024/0319261 A1 Sep. 26, 2024

(51) Int. Cl.
*G01R 31/28* (2006.01)
(52) U.S. Cl.
CPC ..... *G01R 31/2841* (2013.01); *G01R 31/2856* (2013.01)
(58) Field of Classification Search
CPC .......................... G01R 31/2841; G01R 31/2856
USPC ....... 324/600, 617–622, 650, 500, 521, 683, 324/76.11, 76.52, 76.53, 76.77, 757.05, 324/762.03
See application file for complete search history.

(56) References Cited

U.S. PATENT DOCUMENTS

| 5,604,751 | A | 2/1997 | Panis | |
| 5,689,515 | A | 11/1997 | Panis | |
| 5,938,780 | A | 8/1999 | Panis | |
| 6,550,036 | B1 | 4/2003 | Panis | |
| 7,685,487 | B1 * | 3/2010 | Kuo | G01R 31/318563 714/726 |
| 8,756,465 | B2 | 6/2014 | Akita | |
| 9,672,128 | B2 * | 6/2017 | Kang | G06F 11/267 |
| 10,628,275 | B2 * | 4/2020 | Terechko | G06F 11/27 |
| 11,443,825 | B2 * | 9/2022 | Ho | G11C 29/006 |
| 2002/0087924 | A1 | 7/2002 | Panis et al. | |
| 2004/0064765 | A1 | 4/2004 | Panis | |
| 2007/0118315 | A1 | 5/2007 | Panis et al. | |

(Continued)

OTHER PUBLICATIONS

Cote et al., "Streaming Scan Network (SSN): An Efficient Packetized Data Network for Testing of Complex SoCs," 2020 IEEE International Test Conference (ITC), Washington, DC, USA, 2020, pp. 1-10, doi: 10.1109/ITC44778.2020.9325233.

(Continued)

*Primary Examiner* — Huy Q Phan
*Assistant Examiner* — Trung Q Nguyen
(74) *Attorney, Agent, or Firm* — ArentFox Schiff LLP (57) ABSTRACT

An example system is for testing a device under test (DUT) that includes a first core and a second core. The system includes channels in parallel for connecting to a number of pins on the DUT. The channels are for sending test data to the DUT and for receiving measurement data from the DUT based on the test data. The measurement data includes time-division-multiplexed (TDM) data comprised of successive data packets received from the DUT over the channels as part of a bitstream. Each data packet includes a first number of bits from the first core and a second number of bits from the second core. Circuitry associated with the channels is configured to compare the measurement data with expected data, and to determine pass/fail status for the first core and for the second core based on the comparison.

23 Claims, 10 Drawing Sheets

(56) References Cited

U.S. PATENT DOCUMENTS

| | | |
|---|---|---|
| 2007/0118316 A1 | 5/2007 | Panis |
| 2013/0054170 A1 | 2/2013 | Sobajic et al. |
| 2015/0137838 A1 | 5/2015 | Lin et al. |
| 2017/0131351 A1* | 5/2017 | Hao ............... G01R 31/318563 |
| 2019/0278677 A1* | 9/2019 | Terechko ................ G06F 11/27 |
| 2019/0347175 A1 | 11/2019 | Panis et al. |
| 2020/0371887 A1* | 11/2020 | Dalton ................ G06F 11/0724 |
| 2021/0325460 A1 | 10/2021 | Jan et al. |
| 2022/0308109 A1 | 9/2022 | Lin et al. |

OTHER PUBLICATIONS

Marinissen et al., "On IEEE P1500's Standard for Embedded Core Test," Journal of Electronic Testing: Theory and Applications (JETTA), vol. 18, pp. 365-383, (2002), 19 pages.

Marinissen et al., "On Using IEEE P1500 SECT for Test Plug-n-Play," Proceedings International Test Conference 2000 (IEEE Cat. No. 00CH37159), Atlantic City, NJ, USA, 2000, pp. 770-777, doi: 10.1109/TEST.2000.894273, 8 pages.

Marinissen et al., "Towards a Standard for Embedded Core Test," IEEE Int. Test Conference (ITC), Proceedings (IEEE Cat. No. 99CH37034), Atlantic City, NJ, USA, 1999, pp. 616-627, 12 pages.

McLaurin et al., "ETM10 Incorporates Hardware Segment of IEEE P1500," IEEE Design & Test of Computers, vol. 19, No. 3, pp. 6-11, May-Jun. 2002, doi: 10.1109/MDT.2002.1003778, 6 pages.

Tsiatouhas, Y., "CMOS Integrated Circuit Design Techniques: Embedded Core Testing (IEEE 1500 Std.—SECT)," University of Ioannina, Dept. of Computer Science & Engineering, URL: https://www.cs.uoi.gr/~tsiatouhas/CCD/Section_8_6-2p.pdf, (2017), 22 pages.

Zorian et al., "System Chip Test: How Will it Impact Your Design?" Proceedings 37th Design Automation Conference, Los Angeles, CA, USA, 2000, pp. 136-141, doi: 10.1145/337292.337352, 6 pages.

Zorian et al., "Testing Embedded Core-Based System Chips," IEEE Computer, vol. 32, No. 6, (Jun. 1999), 14 pages.

International Search Report and Written Opinion received for PCT Patent Application No. PCT/US2024/019859, mailed on Jul. 15, 2024, 12 pages.

* cited by examiner

FIG. 1

| Mapping | | | | | | | | | | | | | | | | | | | | |
|---|---|---|---|---|---|---|---|---|---|---|---|---|---|---|---|---|---|---|---|---|
| cycle | 0 | 1 | 2 | 3 | 4 | 5 | 6 | 7 | 8 | 9 | 10 | 11 | 12 | 13 | 14 | 15 | 16 | 17 | 18 | 19 |
| frame | 0 | 0 | 0 | 0 | 0 | 1 | 1 | 1 | 1 | 1 | 2 | 2 | 2 | 2 | 2 | 3 | 3 | 3 | 3 | 3 |
| timeslot | 0 | 1 | 2 | 3 | 4 | 0 | 1 | 2 | 3 | 4 | 0 | 1 | 2 | 3 | 4 | 0 | 1 | 2 | 3 | 4 |
| Pin1 | A0[0] | B0[1] | A2[2] | A1[3] | A0[4] | B1[4] | B0[5] | A2[6] | A1[7] | A0[8] | B1[8] | B0[9] | A2[10] | A1[11] | A0[12] | B1[12] | A0[13] | B0[13] | A2[14] | A1[15] |
| Pin2 | A1[0] | B1[1] | B0[2] | A2[3] | A1[4] | A0[5] | B1[5] | B0[6] | A2[7] | A1[8] | A0[9] | B1[9] | B0[10] | A2[11] | A1[12] | A0[13] | A1[13] | B1[13] | B0[14] | A2[15] |
| Pin3 | A2[0] | A0[2] | B1[2] | B0[3] | A2[4] | A1[5] | A0[6] | B1[6] | B0[7] | A2[8] | A1[9] | A0[10] | B1[10] | B0[11] | A2[12] | A1[13] | A2[13] | A0[14] | B1[14] | A0[15] |
| Pin4 | B0[0] | A2[1] | A1[2] | B0[3] | B0[4] | A2[5] | A1[6] | A0[7] | B1[7] | B0[8] | A2[9] | A1[10] | A0[11] | B1[11] | B0[12] | A2[13] | A2[13] | A1[14] | B1[14] | B0[15] |

FIG. 2

| DUT data | | | | | | | | | | | | | | | | | | | | |
|---|---|---|---|---|---|---|---|---|---|---|---|---|---|---|---|---|---|---|---|---|
| cycle | 0 | 1 | 2 | 3 | 4 | 5 | 6 | 7 | 8 | 9 | 10 | 11 | 12 | 13 | 14 | 15 | 16 | 17 | 18 | 19 |
| frame | 0 | 0 | 0 | 0 | 0 | 1 | 1 | 1 | 1 | 1 | 2 | 2 | 2 | 2 | 2 | 3 | 3 | 3 | 3 | 3 |
| timeslot | 0 | 1 | 2 | 3 | 4 | 0 | 1 | 2 | 3 | 4 | 0 | 1 | 2 | 3 | 4 | 0 | 1 | 2 | 3 | 4 |
| Pin1 | 1 | 1 | 1 | 0 | 0 | 1 | 0 | 0 | 0 | 1 | 1 | 0 | 1 | 0 | 0 | 1 | 0 | 0 | 0 | 0 |
| Pin2 | 0 | 0 | 0 | 1 | 0 | 0 | 0 | 0 | 0 | 1 | 1 | 0 | 0 | 0 | 1 | 0 | 0 | 0 | 1 | 1 |
| Pin3 | 0 | 0 | 1 | 1 | 1 | 1 | 1 | 1 | 0 | 0 | 0 | 0 | 0 | 1 | 0 | 1 | 1 | 0 | 1 | 1 |
| Pin4 | 0 | 0 | 1 | 0 | 1 | 1 | 1 | 0 | 1 | 0 | 1 | 0 | 0 | 1 | 1 | 0 | 0 | 1 | 1 | 0 |

FIG. 3

| Expect data | | | | | | | | | | | | | | | | | | | | |
|---|---|---|---|---|---|---|---|---|---|---|---|---|---|---|---|---|---|---|---|---|
| cycle | 0 | 1 | 2 | 3 | 4 | 5 | 6 | 7 | 8 | 9 | 10 | 11 | 12 | 13 | 14 | 15 | 16 | 17 | 18 | 19 |
| frame | 0 | 0 | 0 | 0 | 0 | 1 | 1 | 1 | 1 | 1 | 2 | 2 | 2 | 2 | 2 | 3 | 3 | 3 | 3 | 3 |
| timeslot | 0 | 1 | 2 | 3 | 4 | 0 | 1 | 2 | 3 | 4 | 0 | 1 | 2 | 3 | 4 | 0 | 1 | 2 | 3 | 4 |
| Pin1 | H | H | L | L | L | L | L | L | H | H | L | L | H | L | H | L | L | L | L | L |
| Pin2 | L | H | L | H | L | L | L | L | L | H | L | H | L | L | L | L | H | L | L | H |
| Pin3 | L | L | H | H | H | H | L | L | L | L | L | L | L | L | L | L | H | L | L | L |
| Pin4 | L | L | L | H | H | H | H | H | L | L | L | H | L | L | H | L | H | H | H | H |

| Cumulative Fail (by Core) | | | | | | | | | | | | | | | | | | | | |
|---|---|---|---|---|---|---|---|---|---|---|---|---|---|---|---|---|---|---|---|---|
| cycle | 1 | 2 | 3 | 4 | 5 | 6 | 7 | 8 | 9 | 10 | 11 | 12 | 13 | 14 | 15 | 16 | 17 | 18 | 19 |
| frame | 0 | 0 | 0 | 0 | 1 | 1 | 1 | 1 | 1 | 2 | 2 | 2 | 2 | 2 | 3 | 3 | 3 | 3 | 3 |
| timeslot | 1 | 2 | 3 | 4 | 0 | 1 | 2 | 3 | 4 | 0 | 1 | 2 | 3 | 4 | 0 | 1 | 2 | 3 | 4 |
| Pin1 | 0 | 0 | 0 | 0 | 0 | 0 | 0 | 1 | 1 | 1 | 1 | 1 | 1 | 1 | 1 | 1 | 1 | 1 | 1 |
| Pin2 | 0 | 0 | 0 | 0 | 0 | 0 | 0 | 0 | 0 | 0 | 0 | 0 | 0 | 0 | 0 | 0 | 0 | 0 | 0 |
| Pin3 | 0 | 1 | 2 | 2 | 2 | 3 | 4 | 4 | 4 | 5 | 6 | 6 | 6 | 6 | 6 | 6 | 6 | 6 | 6 |
| Pin4 | 0 | 0 | 0 | 0 | 0 | 0 | 0 | 1 | 1 | 1 | 1 | 1 | 2 | 2 | 2 | 2 | 2 | 2 | 2 |
| Pin1 | 0 | 0 | 0 | 0 | 0 | 0 | 0 | 0 | 0 | 0 | 0 | 0 | 0 | 0 | 0 | 0 | 0 | 0 | 0 |
| Pin2 | 0 | 0 | 0 | 0 | 0 | 0 | 0 | 0 | 0 | 0 | 0 | 0 | 0 | 0 | 0 | 0 | 0 | 0 | 0 |
| Pin3 | 0 | 0 | 0 | 0 | 0 | 0 | 0 | 0 | 0 | 0 | 0 | 0 | 0 | 0 | 0 | 0 | 0 | 1 | 1 |
| Pin4 | 0 | 0 | 0 | 0 | 0 | 0 | 0 | 0 | 0 | 0 | 0 | 0 | 0 | 0 | 0 | 0 | 0 | 0 | 0 |

| Stored Result (by Core) | Fail limit: 5 | | | | | | | | | | | | | | | | | | | |
|---|---|---|---|---|---|---|---|---|---|---|---|---|---|---|---|---|---|---|---|---|
| cycle | 0 | 1 | 2 | 3 | 4 | 5 | 6 | 7 | 8 | 9 | 10 | 11 | 12 | 13 | 14 | 15 | 16 | 17 | 18 | 19 |
| frame | 0 | 0 | 0 | 0 | 0 | 1 | 1 | 1 | 1 | 1 | 2 | 2 | 2 | 2 | 2 | 3 | 3 | 3 | 3 | 3 |
| timeslot | 0 | 1 | 2 | 3 | 4 | 0 | 1 | 2 | 3 | 4 | 0 | 1 | 2 | 3 | 4 | 0 | 1 | 2 | 3 | 4 |
| Pin1 | | H | | | | | | L | L | | H | | | L | | | | | L | |
| Pin2 | H | L | H | | | | L | L | L | | H | | | H | | | | | H | |
| Pin3 | | L | | | | | L | L | L | | L | | | L | | | | | L | |
| Pin4 | L | L | H | | | | H | | L | | L | | | L | | | | | H | |

IDENTIFYING FAILURES IN DEVICE CORES

TECHNICAL FIELD

This specification describes example implementations of systems and processes for identifying failures in device cores and for limiting storage of data from one or more of the device cores following a predetermined number of failures.

BACKGROUND

A test system is configured to test the operation of an electronic device referred to as a device under test (DUT). The test system may include test instruments to send signals that include commands and data to the DUT for testing. The DUT responds with measurement data. The test system expects the measurement data to have certain values. If the measurement data has those values, the DUT passes testing. If the measurement data does not have those values, then the DUT may fail testing.

A DUT may include more than one core. An example core may include a processing unit within the DUT. The test system may receive measurement data from multiple cores in the DUT and determine whether each core has passed or failed testing.

SUMMARY

An example system is for testing a device under test (DUT) that includes a first core and a second core. The system includes channels in parallel for connecting to a number of pins on the DUT. The channels are for sending test data to the DUT and for receiving measurement data from the DUT based on the test data. The measurement data includes time-division-multiplexed (TDM) data comprised of successive data packets received from the DUT over the channels as part of a bitstream. Each data packet includes a first number of bits from the first core and a second number of bits from the second core. The data packets are transmitted in time slots with each time slot corresponding to a transmission of the bitstream on the number of pins in parallel. The TDM data is repeated in a pattern on the channels every predetermined number of time slots. Circuitry associated with the channels is configured to compare the measurement data with expected data, and to determine pass/fail status for the first core and for the second core based on the comparison. The system may include one or more of the following features, either alone or in combination.

The circuitry may be configured to determine fail counts for the first core and for the second core based on the comparison, with a fail count indicating how many times that the first core or the second core has failed a test. The circuitry may be configured to limit storage of subsequently-received measurement data for the first core or for the second core when the fail count exceeds a threshold number for the first core or the second core. Limiting storage may include ignoring the subsequently-received measurement data for the first core or the second core. Limiting storage may include not storing, in memory, the subsequently-received measurement data for the first core or the second core. Limiting storage may include limiting a number of fails in the first core or the second core that affect how many cycles of the subsequently-received measurement data are stored in memory for the first core or the second core. A cycle may include a time slot and where a fail comprises a single failure of the test.

The circuitry may be configured to output the fail count. At least some cycles of measurement data from the first core and the second core may be stored in a results log in the memory. A cycle may include a time slot. The first number of bits and the second number of bits may each be different, and cumulatively different from a number of the pins such that parts of two different data packets are contained in at least some of the time slots. The predetermined number of time slots may be greater than one time slot. The circuitry many be configured to determine pass/fail status by accumulating pass/fail data associated with a time slot in a current frame of data with prior pass/fail data for time slots in prior frames of data. A frame of data may include the predetermined number of time slots. The pass/fail data may be based on a cumulative status for the first core and the second core over multiple repeated patterns of time slots.

Determining the fail counts may include separately counting a number of times that the first core or the second core failed the test. Counting may include incrementing an address of memory based on a time slot. Counting may include incrementing an address of a first memory based on a time slot, where that memory maps the time slot to a core number, and where that core number addresses a second memory The system may include memory. The circuitry may be configured to store, in the memory, a fail count per core following a predetermined number of cycles of the measurement data.

An example system is for testing a DUT that includes a first core and a second core. The system includes channels in parallel for connecting to a number of pins on the DUT. The channels are for sending test data to the DUT and for receiving measurement data from the DUT based on the test data. The measurement data includes TDM data comprised of successive data packets received from the DUT over the channels as part of a bitstream. Each data packet includes a first number of bits from the first core and a second number of bits from the second core. The data packets are transmitted in time slots with each time slot corresponding to transmission of the bitstream on the number of pins in parallel. The TDM data is repeated in a pattern on the channels every predetermined number of time slots. Circuitry associated with the channels tis configured to compare the measurement data with expected data, and to determine fail counts per time slot based on the comparison. A fail count indicates how many times that the first core or the second core has failed a test. The system may include one or more of the following features, either alone or in combination.

The circuitry may be configured to compare the measurement data with expected data by aggregating pass/fail data associated with a time slot in a current frame of data with prior pass/fail data for time slots in prior frames of data. A frame of data may include the predetermined number of time slots. The pass/fail data may be based on a cumulative status per time slot. The circuitry may be configured to limit storage of subsequently-received measurement data for the first core or for the second core when the fail count exceeds a threshold number. Limiting storage may include ignoring the subsequently-received measurement data for the first core or the second core. Limiting storage may include not storing the subsequently-received measurement data for the first core or the second core.

An example system is for testing a DUT that includes a first core and a second core. The system includes channels in parallel for connecting to a number of pins on the DUT. The channels are for sending test data to the DUT and for receiving measurement data from the DUT based on the test data. The measurement data includes TDM data comprised of successive data packets received from the DUT over the channels as part of a bitstream. Each data packet includes a first number of bits from the first core and a second number of bits from the second core. The data packets are transmitted in time slots with each time slot corresponding to a transmission of the bitstream on the number of pins in parallel. The TDM data is repeated in a pattern on the channels every predetermined number of time slots. Circuitry is associated with the channels to mask data from the first core or the second core based on user input. Masking includes ignoring or not storing the data from the first core or the second core in memory.

Any two or more of the features described in this specification, including in this summary section, may be combined to form implementations not specifically described in this specification.

At least part of the devices, systems, and processes described in this specification may be configured or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the devices, systems, and processes described in this specification may be configured or controlled using a computing system comprised of one or more processing devices and memory storing instructions that are executable by the one or more processing devices to perform various control operations. The devices, systems, and processes described in this specification may be configured, for example, through design, construction, composition, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Described herein are example implementations of a test system configured to test devices having multiple cores. An example core includes a processing unit, such as the core of a microprocessor, that is configured to read and to execute computer program instructions. Multiple cores may execute computer program instructions concurrently and independently. A device under test (DUT) may include multiple cores that output time-division-multiplexed (TDM) data. The TDM data includes measurement data that is based on tests performed on the cores during testing. For example, the test system may send test data to cores of the DUT and receive TDM data back from the cores of the DUT that is based on the DUT's response to the test data. The TDM data may be comprised of bits output over multiple test channels, with ones or zeros representing measurements based on tests performed on the DUT. This TDM is analyzed by the test system to identify failures in the cores.

The TDM data is stored in a capture memory on, or associated with, the test system. The capture memory has limited capacity. The example processes described herein may identify cores having more than a predetermined number of failures. Once those cores have been identified, the processes deem the cores to have failed testing. Therefore, the processes may reduce storage of TDM data from the failed cores in the capture memory. This enables the capture memory to store more TDM data for cores that have not failed. Alternatively, the reduced need for storage may enable the test system to use a capture memory that is smaller in size than in prior art systems.

Figure 1:
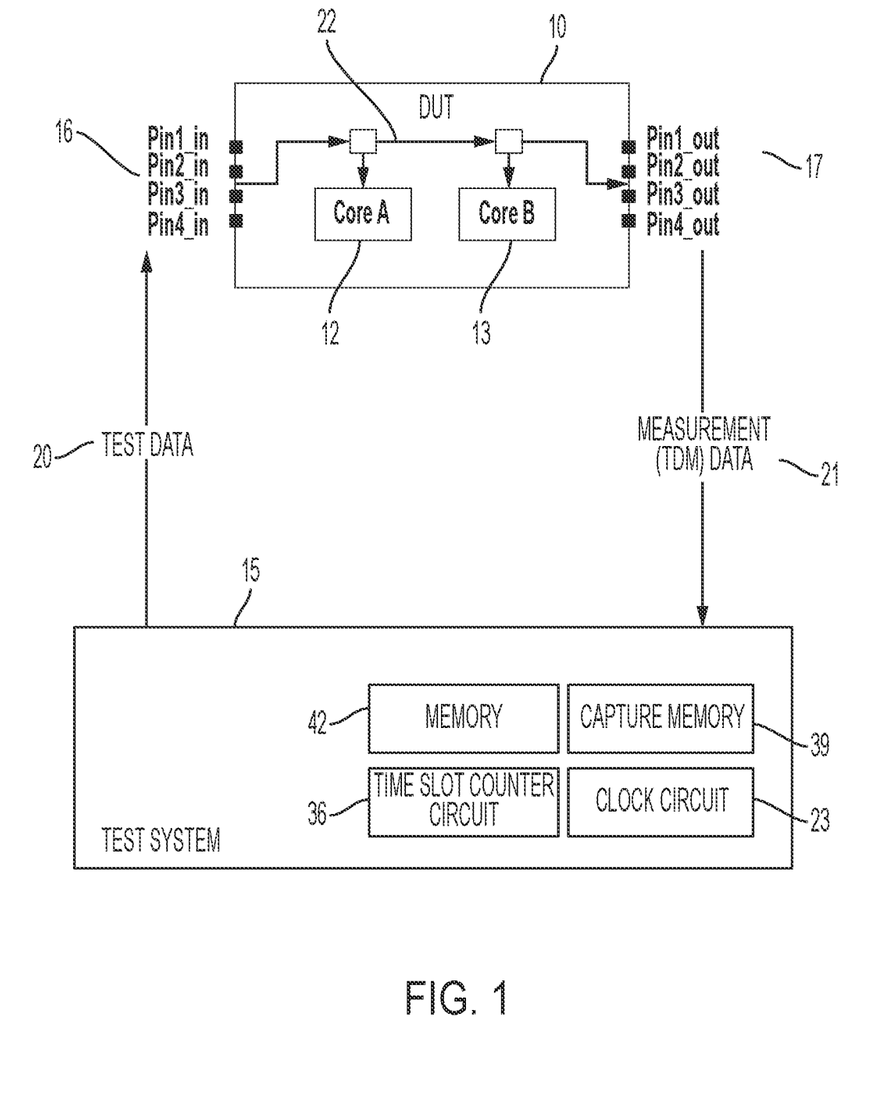
FIG. 1 is a block diagram showing components of an example device under test (DUT) and components of an example test system on which the example processes described herein may be performed.

FIG. 1 is a block diagram showing an example DUT 10 having two cores 12, 13 and a test system 15 configured to test DUT 10. DUT 10 may be any type of electronic device, such as a microprocessor, microcontroller, or the like. Although two cores are shown in FIG. 1, a DUT may include more than two cores. Test system 15 interfaces to DUT 10 through sets of four input pins 16 and four output pins 17 corresponding, respectively, to four input channels and four output channels. Other DUTs may have fewer than, or greater than, four input pins and four output pins. Input pins 16 provide test data 20 from test system 15 to DUT 10 and output pins 17 provide measurement data 21 from DUT 10 to test system 15. In this example, a communication bus 22 runs from input pins 16 to output pins 17 in DUT 10, passing by each core 12, 13. As data is streamed on bus 22, each core 12, 13 may receive test data 20 from bus 22 and place measurement data 21 back onto bus 22.

Data is delivered to, and received from, DUT 10 based on clock cycles. To this end, test system 15 may include one or more clock circuits 23 to control clocking. Test system 15 may provide test data to DUT 10 as a digital pattern burst. The digital pattern burst may be measured in continuously incrementing clock cycles.

Test system 15 may test cores 12, 13 in parallel. In general, during testing of a DUT, test system 15 sends test data to the DUT in N-bit (N>2) packets with a first set of the N bits of each packet being associated with a first core, the next set of the N bits being associated with a second core, and so forth. Test system 15 may receive the measurement data from DUT 10 according to the same timing and configuration that the test data is transmitted to DUT 10. For example, during testing of a DUT, the DUT sends measurement data to the test system in N-bit packets with a same timing as the test data and with a first set of the N bits of each packet being associated with a first core, the next set of the N bits being associated with a second core, and so forth.

Figure 2:
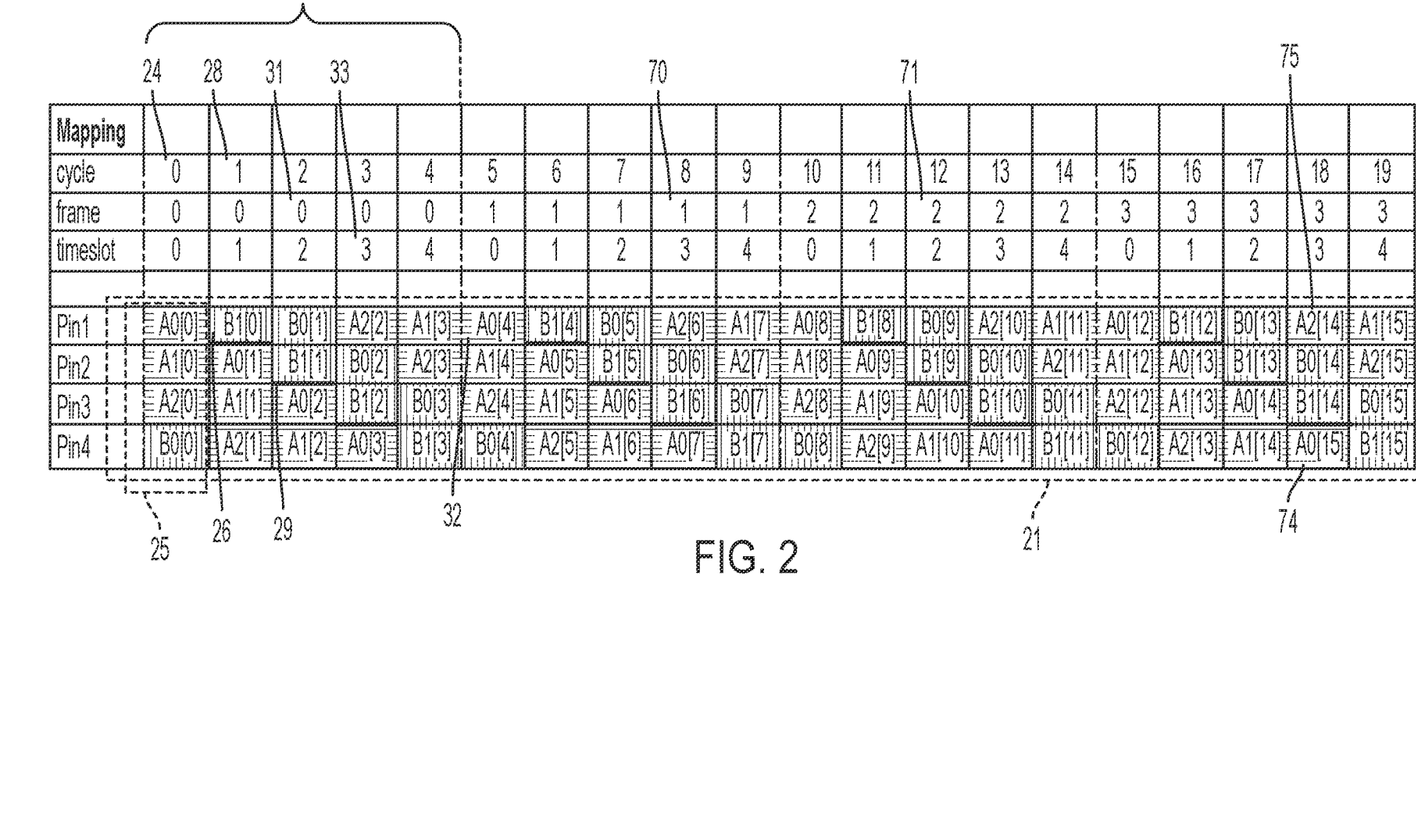
FIG. 2 is an example table showing how time-division-multiplexed measurement data is transmitted over multiple pins and stored.

FIG. 2 shows an example of how measurement data 21 is received at test system 15 from DUT 10 for five-bit packets and the four pins described with respect to FIG. 1. Measurement data 21 for different pin and packet configurations will be different from that shown in FIG. 2. As shown FIG. 2, at each clock cycle 24, one bit of data from either core A 12 or core B 13 is transferred from DUT 10 to test system 15 on each output pin.

As noted, in the example of FIGS. 1 and 2, during testing of DUT 10, DUT 10 sends measurement data to test system 15 in five-bit packets with the first three bits of each packet associated with core A 12 and the last two bits associated with core B 13. In this example, the five bits are annotated A0, A1, A2, B1, and B2, with "A" referring to bits received from core A 12 and "B" referring to bits received from core B 13. Each bit is further annotated with an index to indicate its packet number, so B1[8] indicates that it is the last bit of packet number 8 (the index), which is associated with core B.

In FIG. 2, bits associated with core A 12 are shaded in green represented as horizontal lines and bits associated with core B 13 are shaded in blue represented as vertical lines. With four pins, only four 25 of a data packet's five bits can be transferred on first clock cycle 24. The last bit 26 in the data packet, along with three bits of a second data packet, are transferred in the next clock cycle 28. The second packet's remaining two bits are transferred on the third cycle, and so forth. In FIG. 2, the beginning of each data packet has a horizontal bar above the first bit, such as bar 29. In this example, after five clock cycles 30, the first bit 32 (in this example, A0) of a packet is again transferred on first pin (Pin1). This occurs every time after each five clock cycles for this particular data packet and pin configuration.

This five-cycle period is called a frame 31. Each cycle within the frame is called a time slot 33. A time slot and a cycle include the same data, but a time slot is counted within a frame and its count restarts in each new frame, whereas a cycle is counted upwards starting from zero with no renumbering. In this regard, the clock cycles, data frames, and time slots are numbered to show how data is transferred over time. Data packets having different numbers of bits may have different sized frames.

Referring back to FIG. 1, test system 15 includes a time slot counter circuit 36 that is configured to count clock cycles of clock circuit(s) 23 when data is output and received. Time slot counter circuit 36 restarts its count each time the time slot counter has counted a number of cycles in a frame. In this way, the time slot counter circuit 36 maintains a time slot index for the measurement data. The time slot counter circuit 36 may be configured to specify clock cycles on which the time slot counter will start and restart. So, when constructing a test pattern with which to test a DUT, a test engineer can indicate the cycles on which the time slot counter will start and restart. Example implementations can instantiate a single shared time slot counter or multiple time slot counters for given test data, such as a digital pattern burst.

Because there is a discrepancy between the number of pins and the number of bits per packet, each pin 17 does not transfer data in the order in which the bits occur within a packet. So, in the example shown in FIG. 2, Pin1, for example, transfers bits in the order A0, B1, B0, A2, and A1. Pin2, for example, transfers bits in the order A1, A0, B1, B0, and A2; and so forth.

Figure 3:
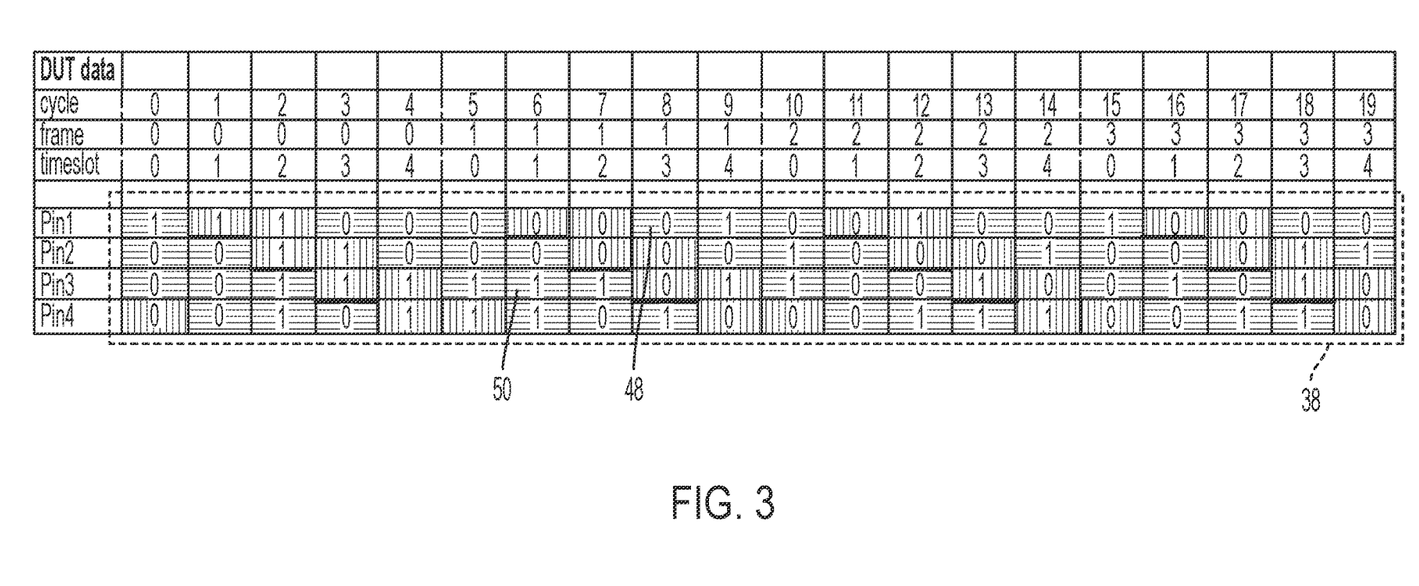
FIG. 3 is an example version of the table of FIG. 2 showing actual data values.

FIG. 3 shows example measurement data 38 (actual ones and zeros) received at test system 15 from the DUT cores A 12 and B 13 for the four pins and five-bit packets described with respect to FIGS. 1 and 2. In FIG. 3, allocations of cycles, frames, and time slots to the two cores is the same in FIG. 2.

Figure 4:
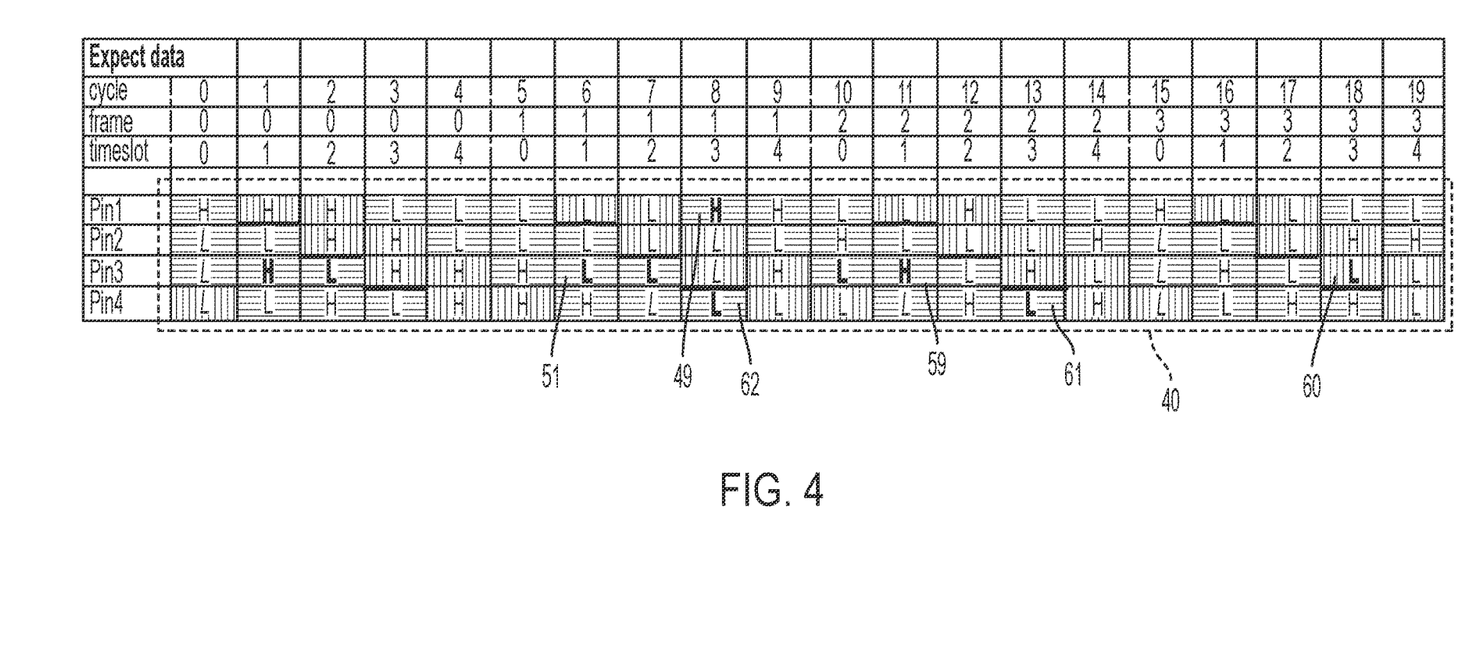
FIG. 4 is an example table showing expected measurement data associated with fail data.

FIG. 4 shows data 40 that is expected to be received at test system 15 from the DUT cores A 12 and B 13 for the four pins and five-bit packets described with respect to FIGS. 1 to 3, where "H" refers to "high" or "1" and L refers to "low" or "0". The expected data is predetermined. For example, the expected data may be the data that a DUT should provide in the event that there are no errors in the DUT's cores, including hardware and/or software in the cores. Test system 15 includes a capture memory 29 or has access to external memory for storing received measurement data. Test system 15 also may contain on-board memory 42 or have access to external memory for storing the expected data. In this regard, the expected data may be received from the DUT manufacturer and preprogrammed into the test system.

In some cases, the measurement data and expected data do not match indicating failures or "fails" in the cores A 12 and/or B 13 of DUT 10. Two example fails are labeled 49 and 51 in FIG. 4. For example, the measurement data 48 received from the DUT in time slot 3, frame 1 is "0" (low) in FIG. 3 and the expected data 49 in FIG. 4 for that frame and time slot is "H". In another example, the measurement data 50 received from the DUT in time slot 1, frame 1 is "1" (high) in FIG. 3 and the expected data 51 in FIG. 4 for that frame and time slot is "L". Such discrepancies between received and expected data indicate fails. The fails are shown in red represented as bold type.

Test system 15 may store fail data—that is, data for a failed transmissions such as 48 and 50 in FIG. 2—in capture memory 39 for subsequent failure diagnosis. Capture memory 39 is a limited resource, so not every failing cycle can be captured. Heretofore, the test system limited storage of the measurement data in the capture memory to a predetermined number of cycles captured by any one pin. The diagram of FIG. 5 shows prior art storage in the capture memory of data cycles containing fails.

Figure 5:
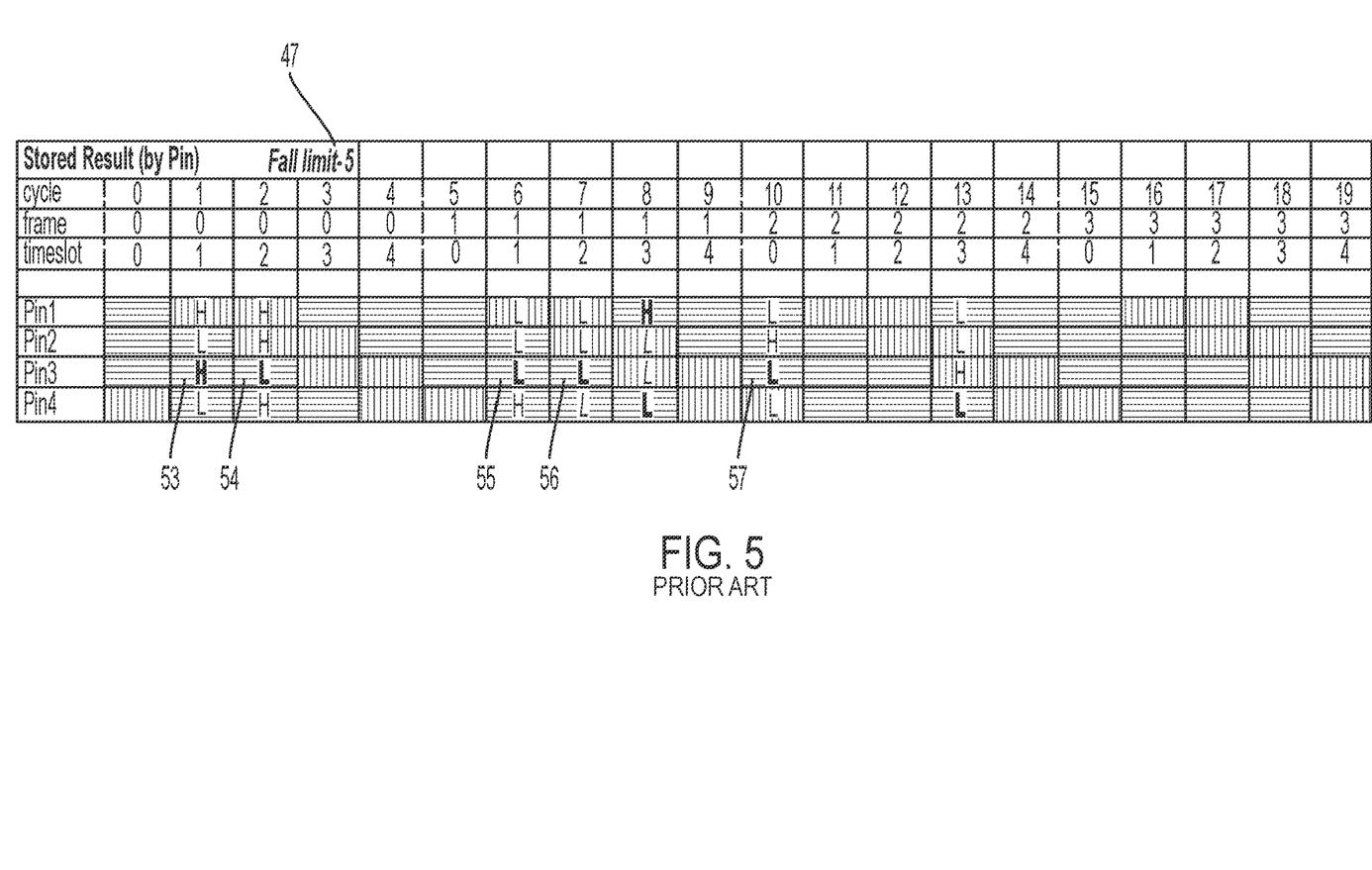
FIG. 5 is an example table showing masking/not storing data by pin.

In the prior art example of FIG. 5, the capture memory is limited to storing five failures per pin 47 irrespective of which core the failure(s) occurred in. Accordingly, Pin3 has reached its maximum storage of five failures 53 to 57 in the capture memory, whereas the other pins have not. As a result, the failures 59 and 60 that occur on Pin3 in cycles 11 and 18 (see FIG. 4) are not stored in the capture memory. The failure 61 that occurs on Pin4 in cycle 13 is stored, because that pin's fail count is only two during that cycle (with the other failure for Pin4 being in frame 1, time slot 3 62).

Limiting storage by a pin's cumulative fail count ensures that no pin's data consumes all of the capture memory, but since a pin's data will be associated with multiple cores, this prior art storage scheme can hide failures on a particular core. For example, the failure 60 that occurs on Pin3 in cycle 18 (FIG. 4) is the only failure associated with core B in this example, yet no record of that failure is stored in the capture memory according to the prior art storage scheme of FIG. 5.

The processes described herein, including process 65 and variants thereof, maintain a record of fails on a per-core basis. By maintaining a record of fails on a per-core basis, the processes are able to limit (e.g., to eliminate) storage of measurement data for a core once a core has been deemed to have failed, thereby increasing memory storage capacity for data for other cores that have not been deemed to have failed. Example process 65 may be performed on a test system, such as those described herein or others not specifically described herein.

Figure 6:
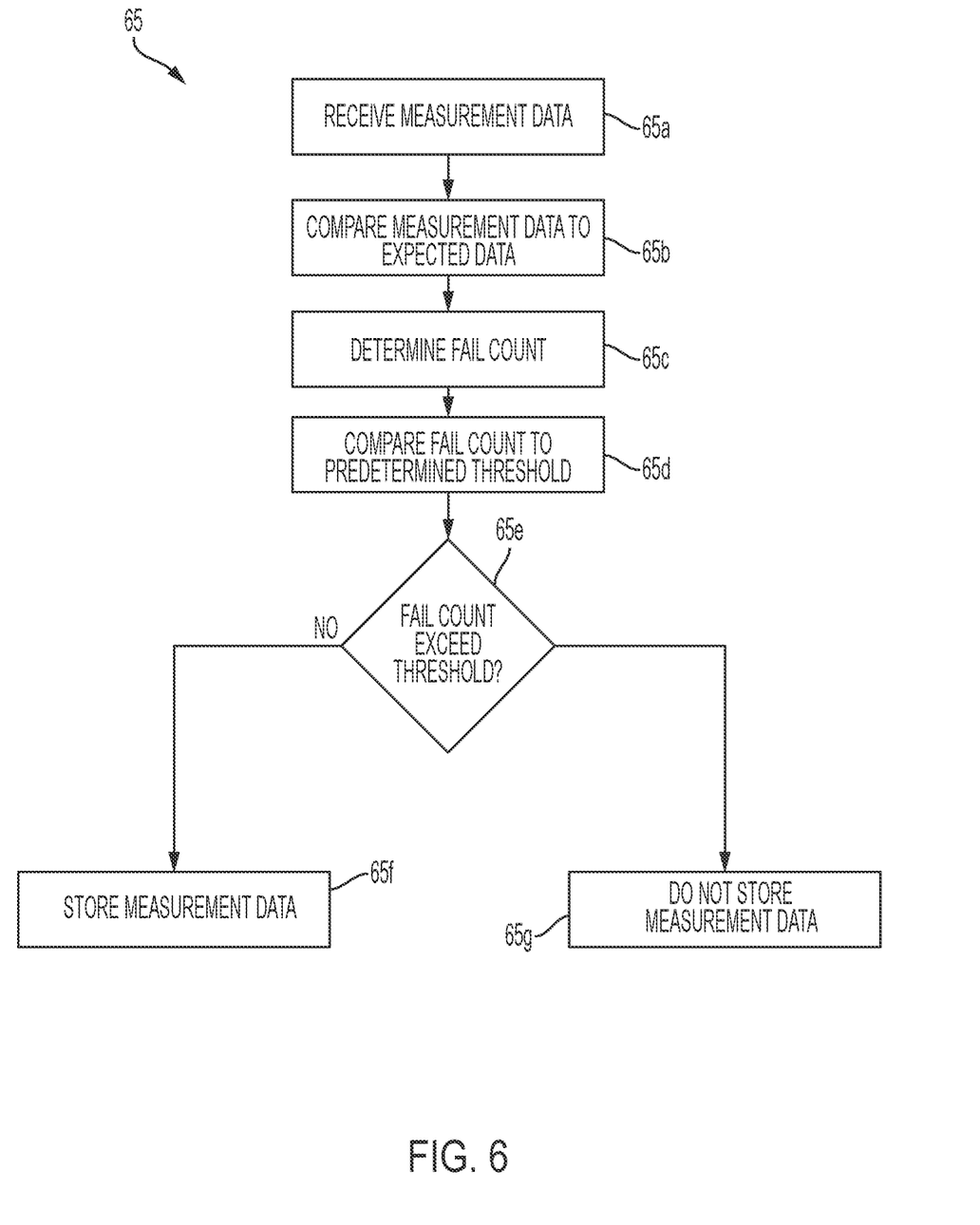
FIG. 6 is a flowchart showing an example process for not storing measurement data based on a DUT core that transmitted the measurement data.

Referring to FIG. 6, example process 65 includes receiving (65*a*) measurement data, e.g., TDM data, from multiple—for example, two or more—cores of a DUT. Process 65 may execute once per cycle.

The measurement data is received at the test system from the DUT over multiple channels. The multiple channels may be multiple pins such as pins 17 of FIG. 1, where each pin corresponds to a channel. The measurement data includes successive data packets that are part of a bitstream. In this example, the measurement data includes a first number of bits from a one core, such as core A 12, and a second number of bits from a second core, such as core B 13; however, the measurement data may contain data from three, four, five, or more cores transmitted in the manner described herein. The measurement data is transmitted in time slots as shown in FIG. 2, with each time slot corresponding to transmission of bits of the bitstream on pins in parallel. The measurement data format (not necessarily the actual data-ones and zeros-itself) is repeated in a same pattern on the channels every frame. For example, as shown in FIG. 2, in frame 0 time slot 0, A0(0) is transmitted at Pin1, A1(0) is transmitted at Pin1, A2(0) is transmitted at Pin3, and B0(0) is transmitted at Pin1. Likewise, in frame 1 time slot 0, A0(4) is transmitted at Pin1, A1(4) is transmitted at Pin1, A2(4) is transmitted at Pin3, and B0(4) is transmitted at Pin1, and so forth.

Process 65 compares (65*b*) the received measurement data to corresponding expected data to determine pass/fail information for first core A 12 and for second core B 13. That is, a comparison of the expected data to the received measurement data identifies bits in the measurement data corresponding to fails in cores of the DUT. Examples of such fails are described with respect to FIG. 4 above. The fails may be stored in a table or other data structure in capture memory 39 (or memory 42) on the test system.

Process 65 determines (65*c*) a fail count per core—in this example, cores A 12 and B 13—and stores the fail count per core in a table or other data structure in memory on the test system. This may be done by identifying and counting a number of times that bits for a core indicate a failure on each pin. For example, if a fail is identified a count associated with a current cycle for a core is incremented The fail count for a core thus indicates how many times that the core has failed tests conducted by the test system.

Figure 7:
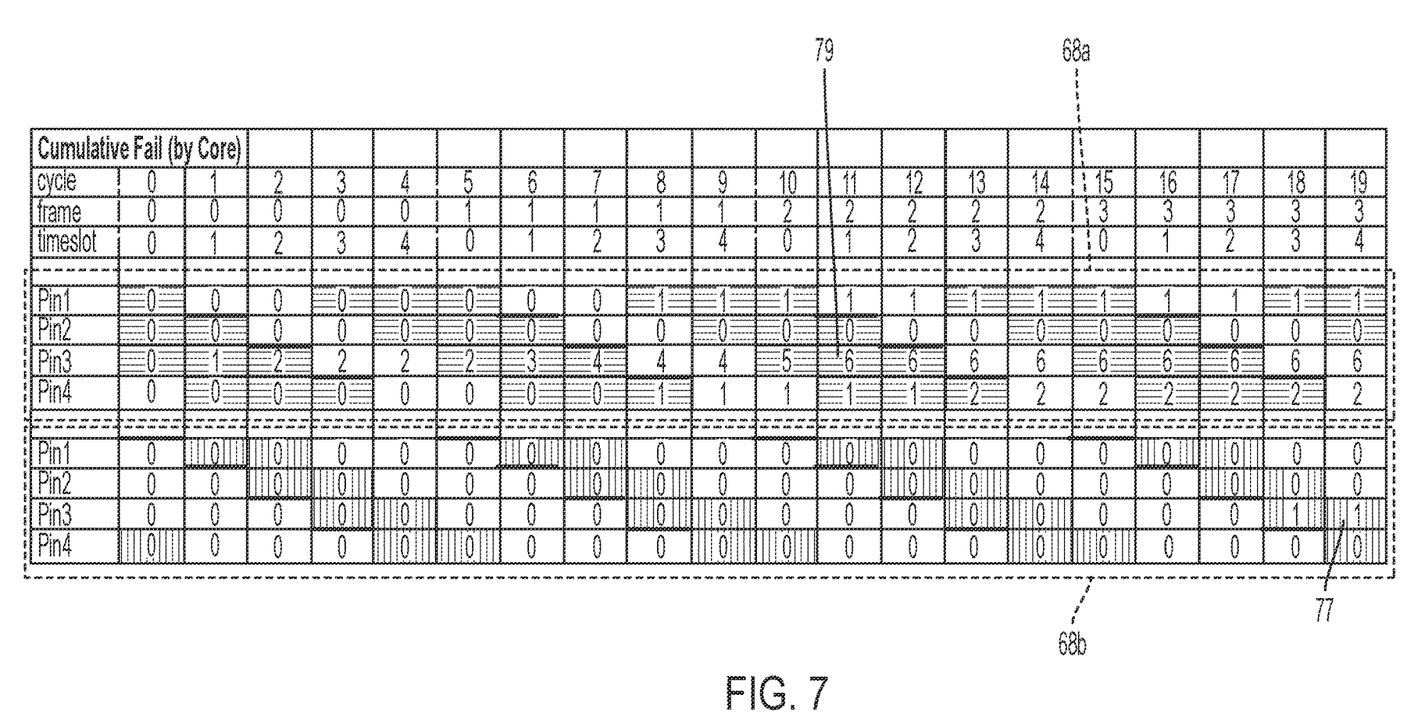
FIG. 7 includes example two tables showing cumulative fail counts for a first core of a DUT and for a second core of the DUT.

FIG. 7 shows per-core cumulative fail counts 68*a* per pin for core A 12 and per-core cumulative fail counts 68*b* for core B 13. This information may be accumulated based on the foregoing comparisons (65*b*) and stored, for example, in a table or other data structure in a capture memory 39 (or memory 42) on the test system.

Process 65 compares (65*d*) the fail count on each pin for each core to a predetermined threshold for the respective core. The threshold for each core may be set based on what the DUT manufacturer or test system operator considers to be an acceptable number of failures for each core. Different cores may have the same predetermined threshold or different predetermined thresholds. The predetermined threshold may be stored in memory 42 on the test system and retrieved by process 65 to perform the comparison.

If the fail count is determined (65*d*) to be less than the predetermined threshold, then the measurement data is stored (65*f*) in the capture memory. If the fail count is determined (65*e*) to be greater than the predetermined threshold, the measurement data is not stored (65*g*) in the capture memory.

In some implementations, a user may specify that a core's fails should be masked. In such implementations, the measurement and expected data need not be compared and the cycle is always considered to have passed. The fail count need not be incremented so a predetermined threshold need not be required to enable this masking. This can be useful when a core is known to cause a large number of failures and it is desired that none of these be recorded. In some implementations, masking includes ignoring all subsequently-received measurement data for a core. The data is subsequently received in the sense that data that is received after the user specifies that the core's fails should be masked is not stored.

In this regard, a software routine or circuitry may provide a way to indicate that one or more cores should not participate in failure detection during a pattern burst. The pattern itself need not modified in order to implement the masking. For each channel, at each time slot index, the routine or circuitry indicates whether any failures detected on that channel will be masked. By indicating that all the time slots associated with a given core of a DUT across all channels will be masked, a test engineer can prevent failures from that region from influencing the failure results. If a test program has already determined that one or more redundant DUT cores fail, the masking can remove those DUT cores from further testing. Masking all the time slots associated with all cores except for one will limit failures to that one DUT core, enabling diagnosis of failures if some of the features described below are not available.

The repeating frame patterns noted above facilitate masking subsequently-received measurement data. Knowing where data occurs for core A and where data occurs for core B enables masking that data. For example, referring to FIG. 2, if data for core A is to be masked after frame "0" 31, the circuitry knows the pattern for core A in frame "1" 70, in frame "2" 71 and so forth because that pattern repeats. Therefore, the data for those subsequent frames can be masked simply by identifying time slots where data for those frames are located based on pattern repetition, thereby reducing the amount of data stored in the capture memory.

In some implementations, process 65 may be configured to generate a value indicating whether data for a time slot associated with a channel is not to be stored based on fail count for a core, such as core A 12 or core B 13. Data may be stored or not stored based on that value. In this regard, some time slots may have only some of their not data stored in memory. For example, referring to FIG. 2, if time slot 3 of frame 3 is subjected to masking, and core A 12 has exceeded its predetermined number of fails but core B 13 has not exceeded its predetermined number of fails, only bits 74 and 75 for core A 12 in that cycle are not stored in the capture memory.

Figure 8:
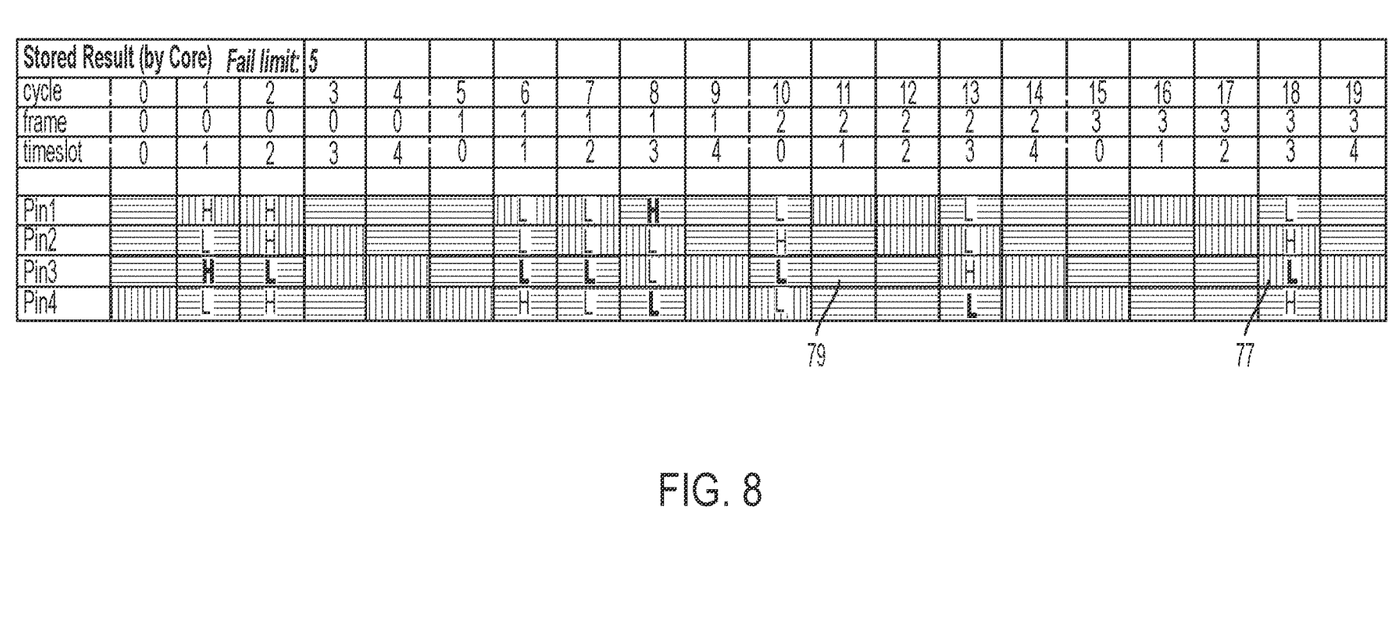
FIG. 8 is an example table showing masking/not storing data by core.

FIG. 8 shows how data storage in the capture memory is limited based on fail count per-core. In FIG. 8, cycles shown with H or L are stored in the capture memory. Referring also to FIG. 7, in cycle 18, Pin3's fail count 77 (FIG. 7) for core B is one, whereas in cycle 11, Pin3's fail count 79 (FIG. 7) for core A is six. In the example of FIG. 8, the core A failure on Pin3, cycle "11" 79 is not stored in the capture memory because core A's fail count of six has exceeded its predetermined failure threshold of five. But, the failure on Pin3, cycle "18" 77 is stored in capture memory because it is associated with core B, which has not exceeded its failure threshold of five.

Figure 9:
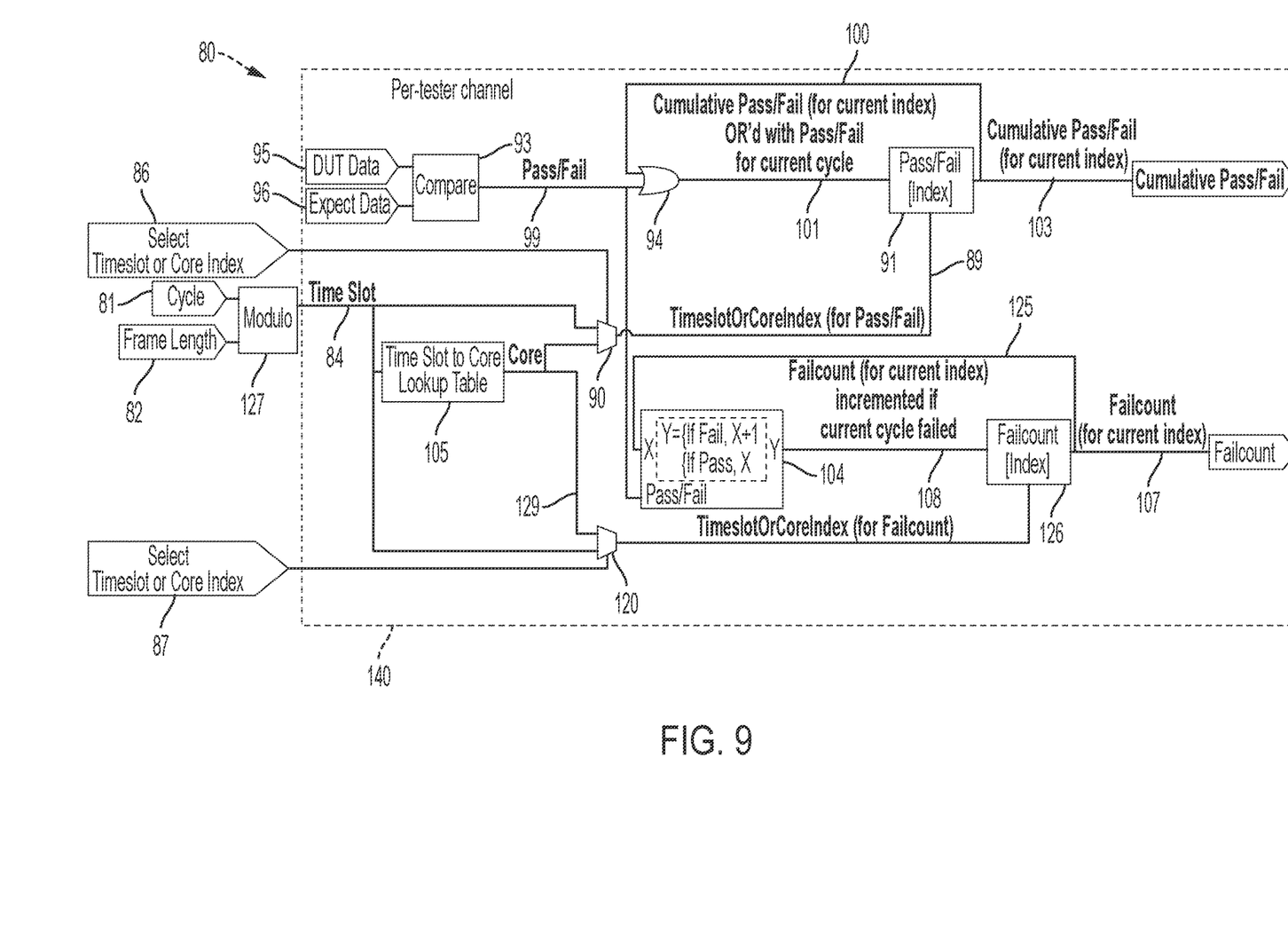
FIG. 9 shows example circuitry for determining whether a core has failed in any time slot and for determining a fail count for the core.

Process 65 may be implemented using a test system containing one or more processing devices and/or containing solid state circuitry. Example solid state circuitry 80 that may be used to perform at least part of process 65 is shown in FIG. 9.

Circuitry 81 also includes two select values ("selects") 86, 87 that may be set to configure the circuit's functionality. The two selects 86, 87 are configurable to determine whether circuitry 140 is "by time slot" or "by core". That is, the selects 86, 87 configure circuitry 140 to update when a core associated with a current cycle has failed on a given cycle or when a time slot associated with a current cycle has failed on a given cycle. Circuitry 140 may be instantiated once per test channel, with the remaining circuitry of FIG. 9 common to all test channels.

Circuitry 80 includes a cycle counter 81 that receives clock cycles, such as cycle 24 of FIG. 2, and that increments by one on every clock cycle to produce a current cycle count. Circuitry 80 stores a preprogrammed, constant frame length 82, which may be stored in memory or a register (not shown). Frame length 82 may be the number of time slots in a frame, such as 30 of FIG. 2. The cycle count and frame length are combined by logic 127 to generate a modulo time slot value 84. The modulo time slot value indicates a current time slot of received measurement data.

Memory 105 stores data that maps time slots to cores. The modulo time slot value 84 is usable to identify a core 129 in a look-up table in memory 105 that maps to the current time slot. Multiplexer 90 selects an index value 89 that corresponds to the identity of a time slot (modulo 84) or the identity of a core (from memory 105) based on select 86. That is, if select 86 indicates by time slot", the identity of the time slot is used and if select 86 indicates "by core", the identity of the core is used. On each clock cycle, index value 89, which corresponds to a current time slot or core, may or may not change, based on selector 90 and lookup table 105.

Memory 91 stores a look-up table or other data structure containing pass/fail values indicating whether at least one bit corresponding to the current time slot or the current core has passed or failed (that is, whether a bit matches expected data). More specifically, this data is based on prior measurements for the time slot or core from past frames of data. For example, the data may be an accumulation of prior measurements for the time slot or core based on past frames of data, as described below.

Circuitry 80 also includes a comparing circuit 93, such as one or more comparators, and a logic element 94, such as an OR gate. On each clock cycle, circuitry 80 indexes memory 91 based on index value 89 to obtain the indexed value 100 from memory for the current time slot or core. That is, a prior measurement for current the time slot or core based on past frames is obtained.

Also in each clock cycle, comparing circuitry 93 compares measurement data 95 in the current time slot and frame to expected data 96 for that same time slot and frame to determine whether the measurement data passed or failed on that clock cycle.

The comparison result 99 is combined with—for example logically OR'd with—with the prior indexed value 100 from memory 91 and the result 101 is stored back in memory 91 as an updated (e.g., accumulated) value that represents whether the core or a time slot associated with the current cycle has failed on any prior cycle associated with the core or that time slot (e.g., in prior frames) That is, during each pattern cycle, a fail result that has been determined is OR'd with the content of the memory at the current time slot or core location based on the index. The memory content thus reflects the accumulated fail status of all previous cycles for that time slot.

In some examples, memory 91 may have a size/capacity that is as deep as the maximum allowed number of time slots and as wide as the number of fail statuses collected in a single pattern cycle.

Circuitry 80 outputs a Boolean status 103 indicating a cumulative pass/fail value for the core or time slot. The cumulative pass/value keeps track of whether the timeslot or core has ever failed. The fail count keeps track of how many times the timeslot or core failed. Where time slots are tracked, this information may be processed after the pattern burst to determine which regions—for example, which cores—of the DUT have failed. That is, if failures are stored per time slot, knowing the repeated pattern of the frames, the test system can identify which cores of the DUT have failed based on failures in the time slots.

Circuitry 80 also includes logic 104 and memory 126 storing "fail counts" indicating the number of fails for a current time slot or core. The fail count indicates a number of failures that have occurred for a given time slot or core. On each cycle, an output 107 of memory 126 reflects the number of times that a time slot or core associated with the current cycle has failed. Logic 104 is configured to use the pass/fail comparison result 99 to determine if the value 108 with which the memory 126 will be updated will be equal to the memory's current value 125 (e.g., if there has not been another fail on the time slot or core) or if that value 125 is to be incremented by one (e.g. if there has been a fail on the time slot or core). If logic 104 determines that the current cycle has failed based on comparison result 99, logic 104 increments the current value 125 by one and outputs the resulting increment value 108 to memory 126. Otherwise, logic outputs the current value 125 to memory 126. This fail count per time slot or core can be used as described herein for limiting the number of cycles that are stored in a capture memory by core or by time slot.

Memory 126 may be indexed by "by time slot" or "by core" based on select 87 and based on the modulo time slot value 85 and core identity 129 using a multiplexer 130 in the same manner as described above with respect to multiplexer 90.

Figure 10:
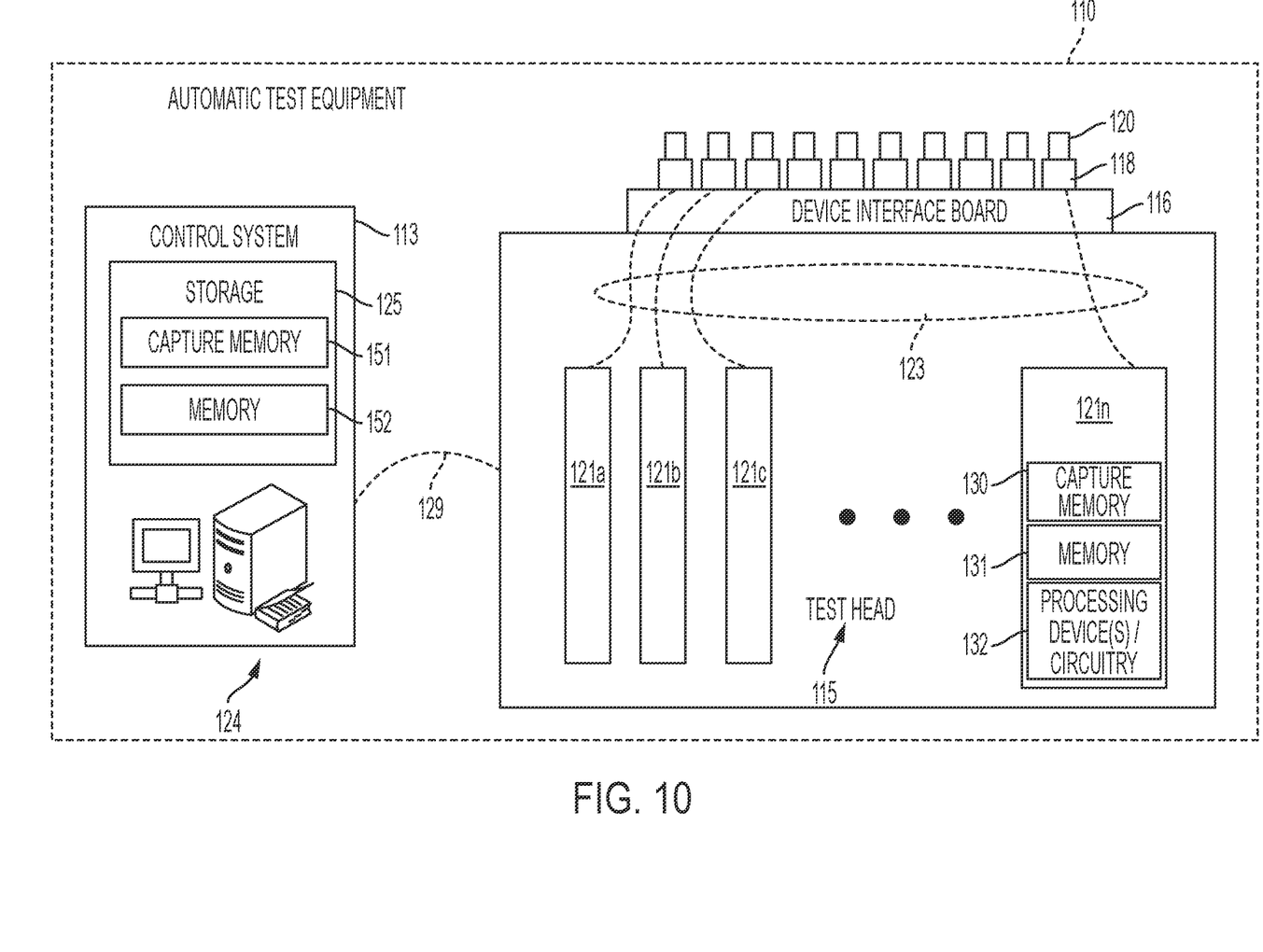
FIG. 10 is a block diagram showing components of an example test system on which the example processes described herein may be performed.

FIG. 10 is a block diagram showing components of example ATE 110 that includes a testing device/apparatus (referred to also as a "tester") 110 and a control system 113. ATE 110 may be an implementation of test system 15 of FIG. 1.

ATE 110 includes a test head 115 and a device interface board (DIB) 116 connected physically and electrically to test head 115. In this example, DIB 116 includes a circuit board that includes mechanical and electrical interfaces at sites 118. One or more DUTs 120, such as DUT 10 (FIG. 1), connect to each of those sites for testing by the ATE. DIB 116 may include, among other things, connectors, conductive traces, conductive layers, and circuitry for routing signals between test instruments in the test head 115, DUTs connected to DIB sites, and other circuitry in the ATE. Power, including voltage, may be run via one or more layers in the DIB to DUTs connected to the DIB.

Test head 115 includes multiple test instruments 121a to 121n, each of which may be configured, as appropriate, to implement testing and/or other functions. Although only four test instruments are shown, ATE 110 may include any appropriate number of test instruments, including one or more residing outside of test head 15. The test instruments may be hardware devices that may include one or more processing devices and/or other circuitry. The test instruments may be configured—for example, programmed—to output commands to test DUTs held on the DIB. The commands to test the DUTs may be or include instructions, signals, data, parameters, variables, test patterns, and/or any other information designed to elicit response(s) from the DUT.

In some implementations, commands to test a DUT may be generated by executing or interpreting, on ATE 110, test program(s) received by ATE 110 from an external system. In an example, a test program may be or include a set of commands that are executed or interpreted by ATE 110 to produce commands that the ATE uses to test the DUT.

One or more—for example, all of—the test instruments may be configured to receive, from the DUT, responses to the commands sent from the ATE to the DUT. The responses include the measurement data described herein. The test instruments may be configured with one or more processing devices and/or the circuitry of FIGS. 1 and 9 132 to analyze the response signals to determine whether DUT cores have passed or failed testing and to store the data in capture memory 130 or memory 131 in accordance with process 65, and/or to send the response signals to control system 113 for analysis in accordance with process 65.

Test channels 123, including pins 16 and 17, are configured between the test head and the DIB to enable communication between the DUTs and the test instruments.

Control system 113 is configured to—e.g., programmed to—communicate with test instruments 121*a* to 121*n* to direct and/or to control testing of the DUTs. In some implementations, this communication 129 may be over a computer network or via a direct connection such as a computer bus or an optical medium. In some implementations, the computer network may be or include a local area network (LAN) or a wide area network (WAN). The control system may be or include a computing system comprised of one or more processing devices 124 (e.g., microprocessor(s)) and memory 125 for storage. Control system 113 may be configured to provide test programs and/or commands to test instruments 121*a* to 121*n* in the test head, which the test instrument(s) use to test the DUT. Control system 113 may also be configured to receive DUT response signals (e.g., measurement data) from the test instrument(s) and to determine whether DUT cores have passed or failed testing and to store the data in capture memory 151 or memory 152 in accordance with process 65.

All or part of the test systems and processes described in this specification and their various modifications may be configured or controlled at least in part by one or more computers such as control system 113 using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the test system and processes described herein can be performed by one or more programmable processors executing one or more computer programs to control or to perform all or some of the operations described herein. All or part of the test systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A system for testing a device under test (DUT), the DUT comprising a first core and a second core, the system comprising:
    channels for connecting to a number of pins on the DUT, the channels for sending test data to the DUT and for receiving measurement data from the DUT based on the test data;
    wherein the measurement data comprises time-division-multiplexed (TDM) data comprised of successive data packets received from the DUT over the channels as part of a bitstream, where each data packet comprises a first number of bits from the first core and a second number of bits from the second core, where the data packets are transmitted in time slots with each time slot corresponding to a transmission of the bitstream on the number of pins, and where the TDM data is repeated in a pattern on the channels every predetermined number of time slots; and
    circuitry associated with the channels to compare the measurement data with expected data, and to determine pass/fail status for the first core and for the second core based on the comparison;

wherein the circuitry is configured to determine fail counts for the first core and for the second core based on the comparison, with a fail count indicating how many times that the first core or the second core has failed a test; and wherein the circuitry is configured to limit storage of subsequently-received measurement data for the first core or for the second core when the fail count exceeds a threshold number for the first core or the second core.

2. The system of claim 1, wherein limiting storage comprises ignoring the subsequently-received measurement data for the first core or the second core.

3. The system of claim 1, wherein limiting storage comprises not storing, in memory, the subsequently-received measurement data for the first core or the second core.

4. The system of claim 1, wherein limiting storage comprises limiting a number of fails in the first core or the second core that affect how many cycles of the subsequently-received measurement data are stored in memory for the first core or the second core, where a cycle comprises a time slot and where a fail comprises a single failure of the test.

5. The method of claim 1, wherein the circuitry is configured to output the fail count.

6. The system of claim 1, further comprising memory; wherein at least some cycles of measurement data from the first core and the second core are stored in a results log in the memory, where a cycle corresponds to a time slot.

7. The system of claim 1, wherein the first number of bits and the second number of bits are each different, and cumulatively different from a number of the pins such that parts of two different data packets are contained in at least some of the time slots.

8. The system of claim 1, wherein the predetermined number of time slots is greater than one time slot.

9. The system of claim 1, wherein the circuitry is configured to determine pass/fail status by accumulating pass/fail data associated with a time slot in a current frame of data with prior pass/fail data for time slots in prior frames of data, where a frame of data comprises the predetermined number of time slots.

10. The system of claim 9, wherein the pass/fail data is based on a cumulative status for the first core and the second core over multiple repeated patterns of time slots.

11. The system of claim 1, wherein determining the fail counts comprises separately counting a number of times that the first core or the second core failed the test.

12. The method of claim 11, wherein counting comprises incrementing an address of memory based on a time slot.

13. The method of claim 11, wherein counting comprises incrementing an address of a first memory based on a time slot, where that memory maps the time slot to a core number, and where that core number addresses a second memory.

14. The system of claim 1, further comprising memory; wherein the circuitry is configured to store, in the memory, a fail count per core following a predetermined number of cycles of the measurement data.

15. A system for testing a device under test (DUT), the DUT comprising a first core and a second core, the system comprising:
channels for connecting to a number of pins on the DUT, the channels for sending test data to the DUT and for receiving measurement data from the DUT based on the test data;
wherein the measurement data comprises time-division-multiplexed (TDM) data comprised of successive data packets received from the DUT over the channels as part of a bitstream, where each data packet comprises a first number of bits from the first core and a second number of bits from the second core, where the data packets are transmitted in time slots with each time slot corresponding to transmission of the bitstream on the number of pins, and where the TDM data is repeated in a pattern on the channels every predetermined number of time slots; and
circuitry associated with the channels to compare the measurement data with expected data, and to determine fail counts per core based on the comparison, with a fail count indicating how many times that the first core or the second core has failed a test;
wherein the circuitry is configured to limit storage of subsequently-received measurement data for the first core or for the second core when the fail count exceeds a threshold number for the first core or the second core.

16. The system of claim 15, wherein the circuitry is configured to compare the measurement data with expected data by aggregating pass/fail data associated with a time slot in a current frame of data with prior pass/fail data for time slots in prior frames of data, where a frame of data comprises the predetermined number of time slots.

17. The system of claim 16, wherein the pass/fail data is based on a cumulative status per time slot.

18. The system of claim 15, wherein limiting storage comprises ignoring the subsequently-received measurement data for the first core or the second core.

19. The system of claim 15, wherein limiting storage comprises not storing the subsequently-received measurement data for the first core or the second core.

20. A system for testing a device under test (DUT), the DUT comprising a first core and a second core, the system comprising:
channels for connecting to a number of pins on the DUT, the channels for sending test data to the DUT and for receiving measurement data from the DUT based on the test data;
wherein the measurement data comprises time-division-multiplexed (TDM) data comprised of successive data packets received from the DUT over the channels as part of a bitstream, where each data packet comprises a first number of bits from the first core and a second number of bits from the second core, where the data packets are transmitted in time slots with each time slot corresponding to a transmission of the bitstream on the number of pins, and where the TDM data is repeated in a pattern on the channels every predetermined number of time slots, and where each of the channels is configured to transmit data from both the first core and the second core; and
circuitry associated with the channels to mask data from the first core or the second core based on user input, where masking comprises not storing, in memory, data from one of the channels for a selected one of the first core or the second core and storing data from the one of the channels for a non-selected one of the first core or the second core.

21. The system of claim 1, wherein the circuitry comprises solid state circuitry.

22. The system of claim 1, wherein the circuitry comprises means for: (i) comparing the measurement data with expected data, (ii) determining pass/fail status for the first core and for the second core based on the comparison, (iii) determining the fail counts; and (iv) limiting storage of subsequently-received measurement data.

23. The system of claim 1, wherein the circuitry comprises one or more processing devices.

\* \* \* \* \*